Dec. 19, 1933.          E. E. HEWITT          1,939,896
BRAKE VALVE DEVICE
Filed April 3, 1931          2 Sheets-Sheet 1
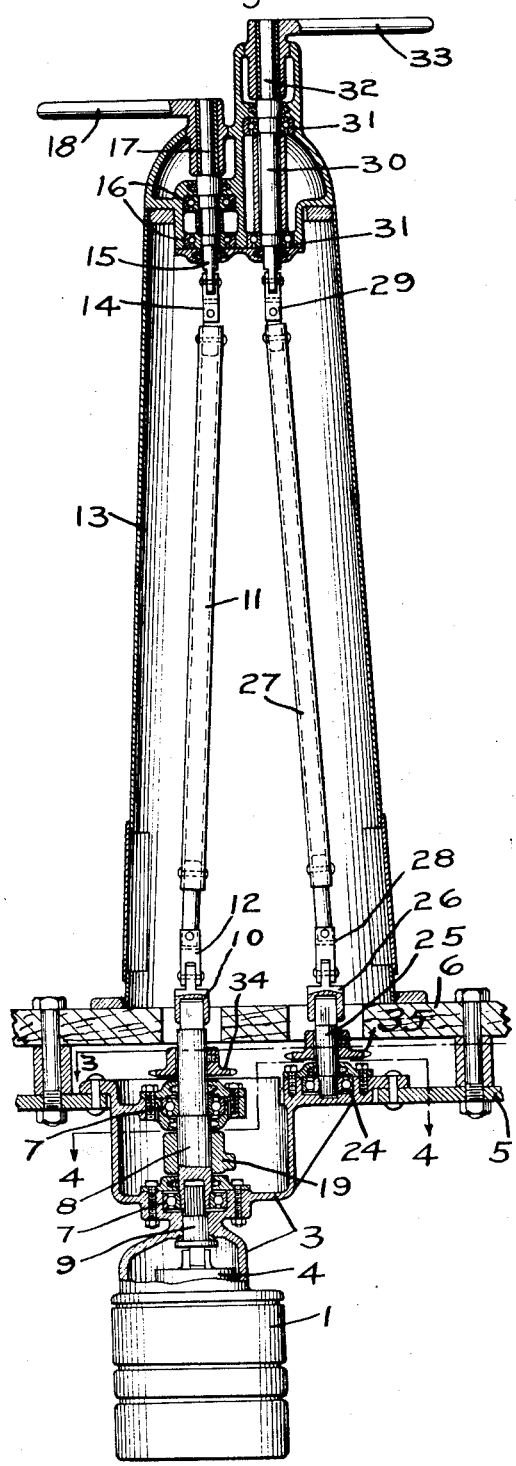
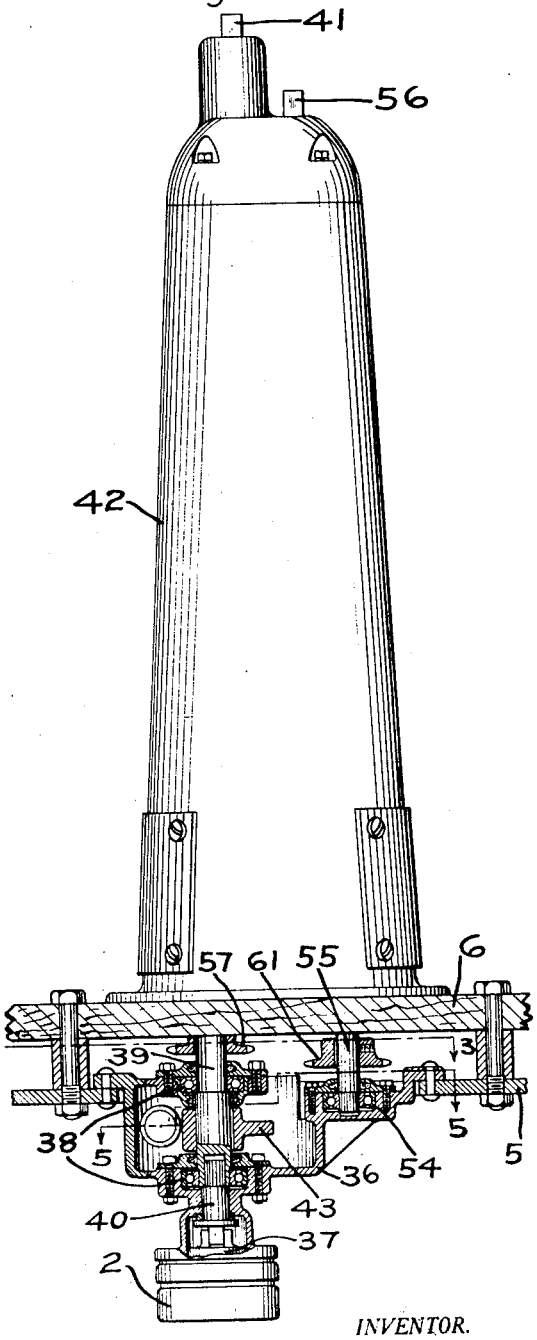
INVENTOR.
ELLIS E. HEWITT
BY  *Wm. M. Cady*
ATTORNEY.

Dec. 19, 1933.  E. E. HEWITT  1,939,896
BRAKE VALVE DEVICE
Filed April 3, 1931   2 Sheets-Sheet 2

INVENTOR.
ELLIS E. HEWITT
BY Wm. M. Cady
ATTORNEY.

Patented Dec. 19, 1933

1,939,896

UNITED STATES PATENT OFFICE 1,939,896

BRAKE VALVE DEVICE

Ellis E. Hewitt, Edgewood, Pa., assignor to The Westinghouse Air Brake Company, Wilmerding, Pa., a corporation of Pennsylvania Application April 3, 1931. Serial No. 527,419

4 Claims. (Cl. 303—50)

This invention relates to fluid pressure brake valve devices and it has particular relation to the automatic and independent brake valve devices commonly employed on locomotives for controlling the brakes on the locomotive and cars of the train, automatically, and independently on the locomotive.

One of the objects of the present invention is to provide means for controlling either the automatic brake valve or the independent brake valve more particularly from either side of the cab of a double end single cab locomotive.

Another object of the invention is to provide improved means for automatically returning the controlling valve of a brake valve device to its running position after having been moved to another operating position.

Another object of the invention is to provide improved means for indicating the position occupied by the brake valve.

Other objects and advantages will appear from the following description and the appended claims.

Figure 3:
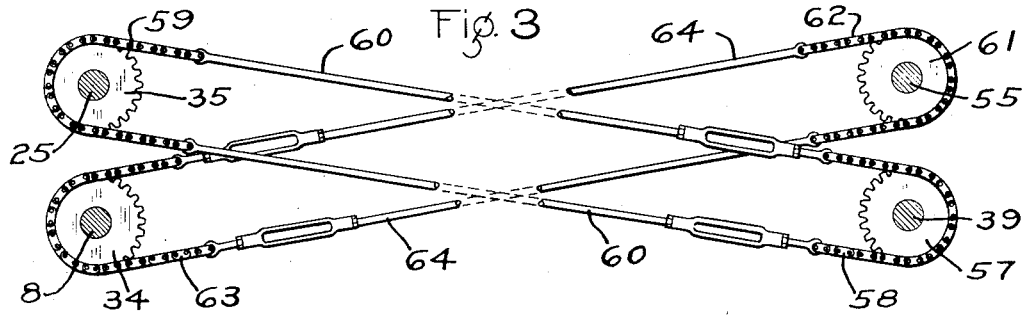
Figure 4:
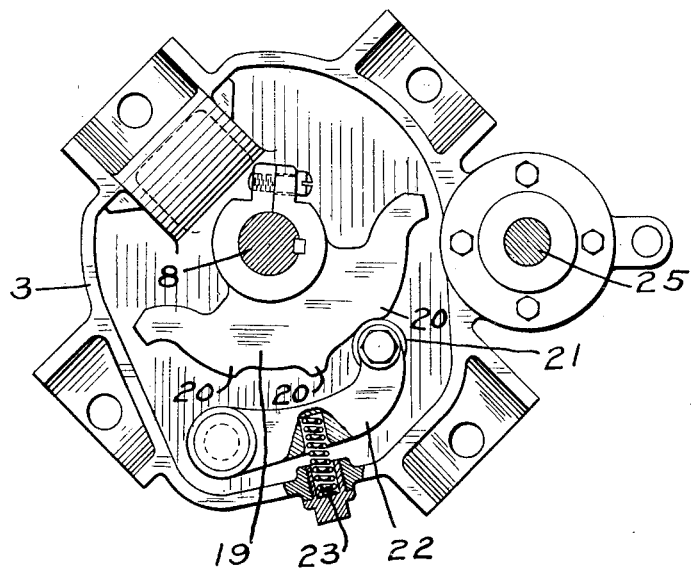
Figure 5:
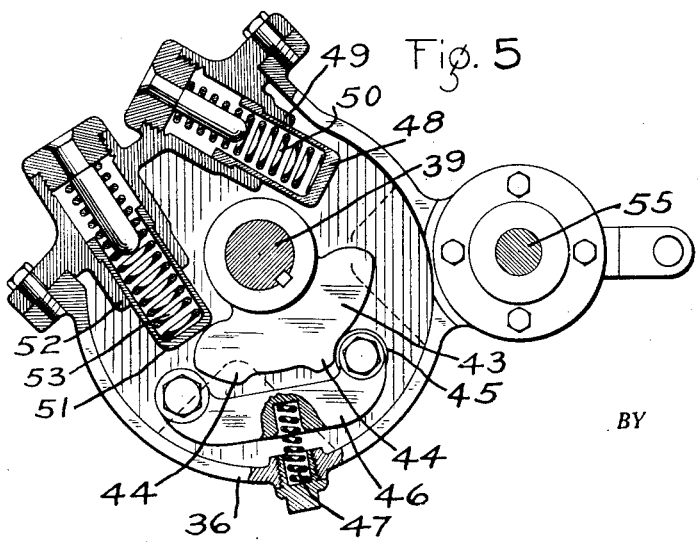

In the accompanying drawings; Fig. 1 is a vertical sectional view of the automatic brake valve portion of the cab brake controlling apparatus, which is disposed at one side of the locomotive cab, and embodying my invention; Fig. 2 is a side elevation, partly in section, of the independent brake valve portion of the cab brake controlling apparatus, disposed at the other side of the cab and embodying my invention; Fig. 3 is a horizontal sectional view taken on line 3—3 of Figs. 1 and 2; Fig. 4 is an enlarged horizontal sectional view taken on line 4—4 of Fig. 1; and Fig. 5 is a similar view taken on line 5—5 of Fig. 2.

According to one feature of my invention, the operator may control the brakes from either side of a locomotive cab either by the operation of a single automatic brake valve device or a single independent brake valve device located on opposite sides of the cab beneath the floor thereof. Associated with the automatic brake valve device on one side of the cab is a main operating shaft for the automatic brake valve device and an auxiliary operating shaft for the independent brake valve device, and associated with the independent brake valve device on the other side of the cab is a main operating shaft for the independent valve device and an auxiliary operating shaft for the automatic brake valve device. The main operating shaft of the automatic brake valve device is operatively connected beneath the floor of the cab with its auxiliary shaft located on the opposite side of the cab, so that when either of these shafts are operated the automatic brake valve will respond. In a like manner, the main operating shaft of the independent brake valve device is operatively connected beneath the floor of the cab with its auxiliary shaft which is located on the opposite side of the cab, so that when either of these shafts are operated, the independent brake valve will respond.

The automatic brake valve device 1 is provided with a casing 3 in which a rotary valve member 4 is mounted for movement between different operative positions such as "release", "running", "holding", "lap", "service" and "emergency", corresponding to the condition of the brake equipment controlled thereby. The casing 1 is suspended from a sub floor 5 carried by the main floor 6 of the cab at one side thereof and houses a pair of bearings 7. A stub shaft 8 is journalled in the bearings 7 and has a spline connection with the upper end of the operating stem 9 of the rotary valve member 4. The upper end of the shaft 8 projects through an opening in the floor 6 and is provided with a squared portion for engagement by a socket member 10 which is secured to the lower end of a shaft 11 by means of a universal jointed connection 12. The shaft 11 extends upwardly through a hollow pedestal 13 mounted on the floor 6 of the cab and is connected at its upper end by a similar jointed connection 14 with a stub shaft 15. The shaft 15 is journalled in bearings 16 carried by the pedestal 13 and is provided at its upper end with a squared portion 17 for engagement by a removable brake handle 18. A segment 19 is fixed to the shaft 8 between the bearings 7 and is provided with a series of raised portions 20 (Fig. 4) for engagement by a roller 21 carried by an arm 22. This arm is pivotally mounted on the casing 3 and is urged by a spring 23 toward a position in which the roller 21 engages the segment 19. The raised portions 20 in the segment 19 correspond in number and position with certain of the positions of the brake valve, hereinbefore mentioned, and indicate to the engineer by the resistance encountered, when the valve has been turned to the desired position.

The casing 3 also carries a bearing 24 in which a stub shaft 25 is journalled. This stub shaft is provided with a squared upper end for engagement by a socket member 26 which is secured to the lower end of a shaft 27 by means of a jointed connection 28. The shaft 27 also extends upwardly through the pedestal 13 and is connected at its upper end by a jointed connection 29 with a stub shaft 30. The shaft 30 is journalled in bearings 31 carried by the pedestal 13 and is provided at its upper end with a squared portion 32 for engagement by a removable brake handle 33. A sprocket wheel 34 is fixed to the shaft 8 above the bearings 7 and a sprocket wheel 35 is secured to the shaft 25 above the bearing 24. The function and operation of these sprocket wheels as well as that of the brake handle 33 and associated parts will hereinafter be described.

The independent brake valve device 2 is located on the opposite side of the cab from the automatic brake valve device 1, hereinbefore described, and is provided with a casing 36 in which a rotary valve member 37 is mounted for movement between a plurality of brake applying positions. The casing 36 is also suspended from the sub-floor 5 and houses a pair of bearings 38. A stub shaft 39 is journalled in the bearings 38 and has a spline connection with the upper end of the operating stem 40 of the rotary valve member 37.

The shaft 38 is rotated by means of a stub shaft 41 which is journalled in the upper end of a pedestal 42 mounted on the floor 6 on the other side of the cab and is provided with a squared upper end for engagement by the brake handle 33. The operative connections between the shaft 39 and the shaft 41 is identical to that hereinbefore described in connection with the structure shown in Fig. 1, and therefore, these connections are not illustrated in Fig. 2 of the drawings.

An indicating segment 43 is fixed to the shaft 39 between the bearings 38 and is provided with two raised portions 44 (Fig. 5) for engagement by a roller 45 carried by an arm 46. This arm is pivotally mounted on the casing 36 and is yieldably urged into engagement with the segment 43 by a spring 47. This segment performs a function identical with that described in connection with the segment 19 of the automatic valve 1 in that the resistance encountered when the roller 45 passes over the raised portions 44 serves to indicate the position to which the valve is turned.

A plunger 48 is slidably mounted in a socket 49 formed on the casing 36 for engagement by one end of the segment 43 when the valve is moved to its release position. This plunger is urged outwardly by a spring 50, so that if the engineer releases the valve handle after having turned the valve to its release position, the plunger will automatically return the valve to its running position. Similarly, a plunger 51 is slidably mounted in a socket 52 formed on the casing 36 for engagement by the other end of the segment 43 when the valve is moved to its quick application position. This plunger is urged outwardly by a spring 53, so that if the engineer should release the valve handle after having moved the valve to its quick application position, the plunger 51 will automatically return the valve to its slow application position. The automatic return of the valve from release to running position is to prevent leaving the handle in release position and thereby make it impossible to operate the locomotive brake with the automatic brake valve. The action of the plunger 51 between the quick application and slow application positions is to make the latter more prominent, so that in rapid movement of the valve, the engineer is less likely to unintentionally pass over to the quick application position and obtain a heavy application of the locomotive brakes when only a light application is desired.

The casing 36 also carries a bearing 54 in which a stub shaft 55 is journalled. This shaft is rotated by a shaft 56 journalled in the pedestal 42 through the medium of connections identical with that shown in Fig. 1.

A sprocket wheel 57 is fixed to the shaft 39 and is connected to the sprocket wheel 35 by means of sprocket chains 58 and 59 and adjustable connecting rods 60. Also, a sprocket wheel 61 is fixed to the shaft 55 and is connected to the sprocket wheel 34 by sprocket chains 62 and 63 and adjustable connecting rods 64. By means of this construction, either the automatic brake valve or the independent brake valve may be operated from either side of the cab, according to the direction of movement of the locomotive.

While only one illustrative embodiment of the invention has been herein shown and described in detail, it is not my intention to limit its scope to this embodiment or otherwise than by the terms of the appended claims.

Having now described my invention, what I claim as new and desire to secure by Letters Patent, is:

1. In a fluid pressure brake equipment, the combination of an automatic brake valve device disposed at one side of the cab of a locomotive, an independent brake valve device disposed at the other side of said cab, means for directly operating each brake valve device, an operating connection from each brake valve device to the opposite side of the cab, and manually operated means for operating each brake valve device through its corresponding operating connection.

2. In a fluid pressure brake equipment, the combination of a manually operable brake valve device including a valve member disposed in the cab of a locomotive, a shaft disposed in said cab for operating said valve member, another shaft disposed in said cab at a point remote from said first mentioned shaft for operating said valve member, a sprocket wheel carried by said first mentioned shaft, a sprocket wheel carried by said second mentioned shaft, and a sprocket chain device connecting said sprocket wheels for causing both of said shafts to rotate when one is rotated.

3. In a fluid pressure brake equipment, the combination of an automatic brake valve device disposed in the cab of a locomotive, an independent brake valve device disposed in said cab at a point remote from said automatic brake valve device, a pair of valve operating shafts associated with each of said valve devices, one shaft of each pair having a direct operating connection with the associated valve device, and the other shaft of each of said pairs having an indirect operating connection with the other of said valve devices.

4. In a fluid pressure brake equipment, the combination of an automatic brake valve device disposed in the cab of a locomotive, an independent brake valve device disposed in said cab at a point remote from said automatic brake valve device, an automatic brake valve operating shaft associated with each of said valve devices, an independent brake valve operating shaft associated with each of said valve devices, means operatively connecting said automatic brake valve operating shafts to cause both to rotate when one is rotated, and means operatively connecting said independent brake valve operating shafts to cause both to rotate when one is rotated.

ELLIS E. HEWITT.